UNITED STATES PATENT OFFICE.

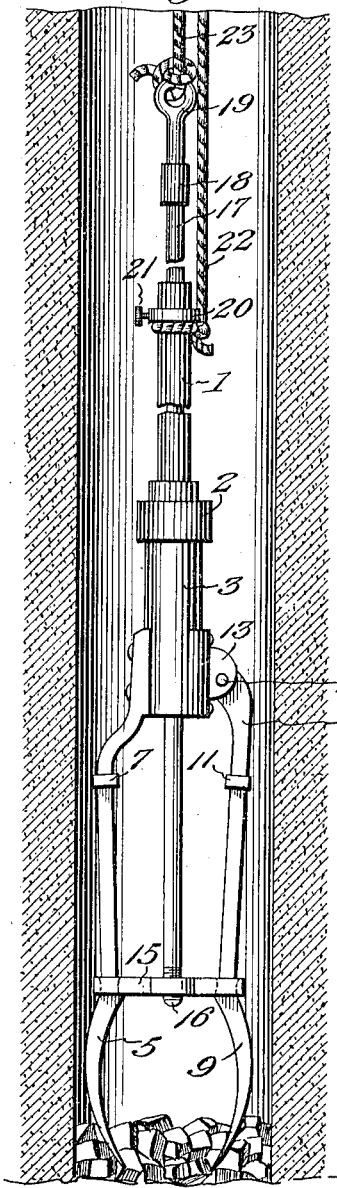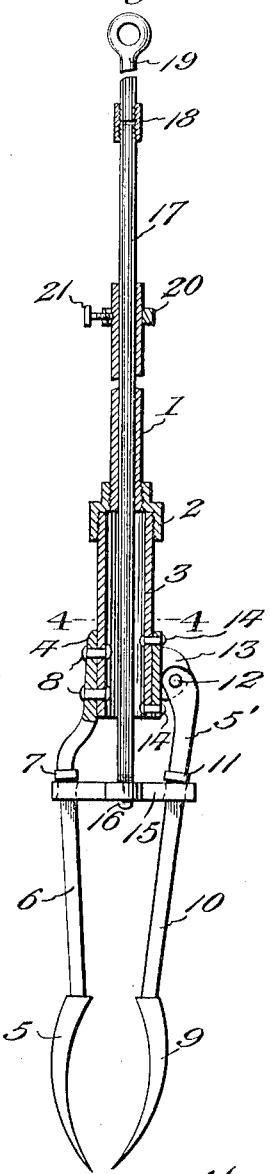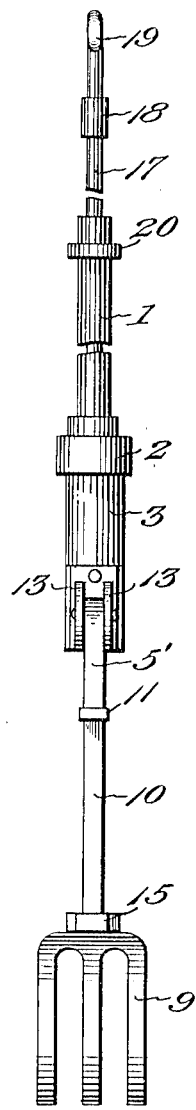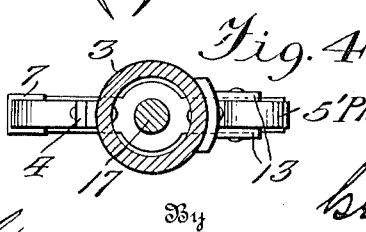

PHILO D. BUNDY, OF MOUNT VERNON, INDIANA.

WELL-DIGGER'S TOOL.

1,079,162.  Specification of Letters Patent.  Patented Nov. 18, 1913.

Application filed March 25, 1912. Serial No. 685,989.

*To all whom it may concern:*

Be it known that I, PHILO D. BUNDY, a citizen of the United States, and a resident of Mount Vernon, in the county of Posey and State of Indiana, have invented certain new and useful Improvements in Well-Diggers' Tools, of which the following is a specification, reference being had to the accompanying drawings.

This invention has relation to certain new and useful improvements in well diggers' tools, and my invention comprises a grappling tongs by means of which the small rocks and stones displaced by the drills and augers can be readily and expeditiously removed from the bottom of the well.

With these and other objects in view, the present invention consists in the combination and arrangement of parts as will be hereinafter more fully described and finally pointed out in the appended claim, it being further understood that changes in the specific structure shown and described may be made within the scope of the claim without departing from the spirit of the invention.

In the accompanying drawings forming a part of this specification and in which like numerals of reference indicate similar parts in the several views: Figure 1, shows a view of my grappling tongs in an open position at the bottom of the well. Fig. 2, shows a sectional view with the tongs in their closed condition. Fig. 3, is an end view. Fig. 4, is a section on line 4, 4 of Fig. 2.

In the boring of wells, small stones and rocks are displaced by the drills and augers. The boring tools not being so constructed as to bring these to the surface, they roll around at the bottom of the well, until they finally interfere with the proper operation of the drill or auger. A special tool is then required to remove these loose stones and rocks and in my present invention I provide such a tool, which can be positively and expeditiously operated to clear the well of all loose rocks and stones.

In carrying out the aim of my invention I employ a tubular sleeve 1, of any suitable length having its lower end threaded to receive the interiorly threaded coupling 2. A tubular collar 3, is screwed into this coupling as clearly shown in Fig. 2. The diameter of the collar 3, is considerably greater than that of the sleeve 1, as shown.

Fixed to the lower end of the collar 3, by means of the rivets 8, is the fork 4, including a plurality of tines 5, and a straight tang 6. As shown at the end of the tang 6, is located a stop collar 7.

Secured to the collar 3, at a point opposite the fixed fork member 4, are the ears 13, secured by means of the rivets 14. These ears carry a pivot pin 12, to which is pivotally secured the fork 5', having the tines 9, tang 10, and the stop collar 11, this construction being clearly shown in Fig. 2.

Slidably held within the sleeve 1, is the operating rod 17, the lower end of which is threaded as shown at 16, so that the same can be screwed into the yoke 15, which has two openings as indicated in dotted lines in Fig. 2, to receive the tangs 6 and 10. In reciprocating this operating rod 17, the fork member 10, can be carried away or toward the fixed fork 6. At its upper end the operating rod 17, has a coupling 18, receiving the eye-bolts 19, to which is secured the operating strand 23.

Secured to the upper end of the sleeve 1, is the stop collar 20, held by means of the set screw 21. This collar is provided so that the carrying strand 22, can be secured to the sleeve 1. As shown in Fig. 1, the carrying strand 22, is in line with the moving fork 10. The carrying strand could be easily shifted to the opposite side to bring the same immediately above the fixed fork 6. As this fork member 6, is fixed, the same in being lowered when the strand 22, is immediately above the same will engage the side of the well. When it is desired to grapple the stones, the operator raises the yoke 13, by means of the operating strand 23, to carry the fork member 10, toward the fork member 6. The tool is then raised and emptied. The operation is of course, repeated until all the loose stones have been removed from the well.

It is, of course, understood that tools embodying my invention may be made of various sizes.

The tool is simple and inexpensive in construction and both durable and efficient in operation and the device further may be operated with ease, accuracy and despatch to remove stones and rocks from the bottom of the well.

Having thus described my said invention, what I claim as new and desire to secure by United States Letters Patent is:

A device of the character described, having in combination, a sleeve, a coupling secured to the lower end of said sleeve, a collar extending from said coupling, a fork fixed to the lower end of said collar having a plurality of tines and a straight tang, an ear secured to said collar opposite said fork, a fork having a plurality of tines and a straight tang pivoted to said ear and arranged for co-action with said fixed fork, a yoke sliding upon and guided by said fixed fork tang and engaging said pivoted fork tang and an operating rod guided within said sleeve and secured at its lower end to said yoke, each of said tangs having a stop shoulder to limit the upward movement of said yoke.

In testimony whereof I affix my signature, in presence of two witnesses.

PHILO D. BUNDY.

Witnesses:
JAMES F. MCFADDEN,
R. U. BARKER.

---

Copies of this patent may be obtained for five cents each, by addressing the "Commissioner of Patents, Washington, D. C."